United States Patent
Kim et al.

(10) Patent No.: US 9,137,820 B2
(45) Date of Patent: Sep. 15, 2015

(54) METHOD FOR TRANSMITTING SCHEDULING INFORMATION IN MOBILE COMMUNICATION SYSTEM AND FEMTOCELL BASE STATION APPARATUS USING THE SAME

(75) Inventors: Byoung Hoon Kim, Anyang-si (KR); Young Seob Choi, Anyang-si (KR); Seo Woo Jang, Anyang-si (KR); Han Byul Seo, Anyang-si (KR); Hyung Tae Kim, Anyang-si (KR); Jun Ho Jo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 637 days.

(21) Appl. No.: 12/820,093

(22) Filed: Jun. 21, 2010

(65) Prior Publication Data

US 2010/0322180 A1 Dec. 23, 2010

Related U.S. Application Data

(60) Provisional application No. 61/219,387, filed on Jun. 23, 2009.

(30) Foreign Application Priority Data

Dec. 1, 2009 (WO) ................ PCT/KR2009/007104

(51) Int. Cl.
*H04W 72/12* (2009.01)
*H04W 16/32* (2009.01)
*H04W 84/04* (2009.01)

(52) U.S. Cl.
CPC .......... *H04W 72/1289* (2013.01); *H04W 16/32* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 8,320,319 B2 | 11/2012 | Lohr et al. | |
| 2004/0203831 A1* | 10/2004 | Khan | 455/452.2 |
| 2005/0281247 A1* | 12/2005 | Lim et al. | 370/350 |
| 2007/0115878 A1* | 5/2007 | Ashish et al. | 370/329 |
| 2008/0076425 A1 | 3/2008 | Khetawat et al. | |
| 2008/0186939 A1* | 8/2008 | Kim et al. | 370/343 |
| 2009/0040972 A1 | 2/2009 | Robson et al. | |
| 2009/0098871 A1* | 4/2009 | Gogic | 455/435.1 |
| 2009/0109922 A1 | 4/2009 | Livanos | |
| 2009/0117901 A1* | 5/2009 | Zhao et al. | 455/436 |

(Continued)

FOREIGN PATENT DOCUMENTS

| KR | 1020090008055 | 1/2009 |
|---|---|---|
| KR | 100883268 | 2/2009 |
| KR | 10-0901318 | 6/2009 |

OTHER PUBLICATIONS

United States Patent and Trademark Office U.S. Appl. No. 13/380,497, Office Action dated Mar. 17, 2014, 25 pages.

*Primary Examiner* — Chirag Shah
*Assistant Examiner* — Joshua Smith
(74) *Attorney, Agent, or Firm* — Lee, Hong, Degerman, Kang & Waimey

(57) ABSTRACT

A method for transmitting scheduling information in a mobile communication system and a femtocell base station apparatus using the same are provided. Scheduling information can be transmitted using a hierarchical scheduling scheme in which a femtocell base station is allocated resources from a macrocell base station and the femtocell base station then allocates resources to femto users within its own resource region.

12 Claims, 14 Drawing Sheets

(56) References Cited

U.S. PATENT DOCUMENTS

| | | |
|---|---|---|
| 2009/0161591 A1* | 6/2009 | Ahmadi et al. ............... 370/344 |
| 2009/0163221 A1* | 6/2009 | Abedi ........................ 455/452.1 |
| 2009/0191813 A1* | 7/2009 | Abedi ............................ 455/62 |
| 2009/0191888 A1* | 7/2009 | Abedi ........................... 455/450 |
| 2009/0209199 A1* | 8/2009 | Suga ................................ 455/7 |
| 2009/0252079 A1* | 10/2009 | Zhang et al. .................. 370/315 |
| 2009/0270107 A1* | 10/2009 | Lee et al. ...................... 455/450 |
| 2009/0303918 A1* | 12/2009 | Ma et al. ....................... 370/315 |
| 2010/0111021 A1 | 5/2010 | Hui |
| 2010/0136989 A1* | 6/2010 | Westerberg et al. .......... 455/450 |
| 2010/0157820 A1* | 6/2010 | Cheng et al. .................. 370/252 |
| 2010/0208710 A1* | 8/2010 | Kwak et al. ................... 370/336 |
| 2010/0322180 A1 | 12/2010 | Kim et al. |
| 2011/0064032 A1* | 3/2011 | Sun et al. ...................... 370/328 |
| 2011/0205954 A1 | 8/2011 | Gorokhov et al. |
| 2011/0216676 A1 | 9/2011 | Li et al. |
| 2011/0223923 A1* | 9/2011 | Cho et al. ...................... 455/448 |

* cited by examiner

Macro PDCCH of corresponding frame is transmitted at the same time

METHOD FOR TRANSMITTING SCHEDULING INFORMATION IN MOBILE COMMUNICATION SYSTEM AND FEMTOCELL BASE STATION APPARATUS USING THE SAME

CROSS REFERENCE TO RELATED APPLICATIONS

Pursuant to 35 U.S.C. §119(a), this application claims the benefit of earlier filing date and right of priority to International Application No. PCT/KR/2009/007104, filed on Dec. 1, 2009, which claims the benefit of U.S. Provisional Application No. 61/219,387, filed on Jun. 23, 2009, and pursuant to 35 U.S.C. 119(e), this application also claims the benefit of U.S. Provisional Application No. 61/219,387, filed on Jun. 23, 2009, the contents of which are all incorporated by reference herein in their entirety.

BACKGROUND OF THE INVENTION

1. Field of the Invention

The present invention relates to a method for transmitting scheduling information, and more particularly, to a method for transmitting scheduling information in a hierarchical cell structure.

2. Discussion of the Related Art

A femtocell base station, which is a small-size version of a macrocell base station, performs most functions of the macrocell base station. The femtocell base station may be installed in an area covered by the macrocell base station or may be installed in a shadow area that is not covered by the macrocell base station. The femtocell base station has a network structure that operates independently. A far greater number of femtocell base stations than relay base stations are installed indoors or outdoors. A list of neighboring base stations that a base station transmits to a mobile station does not include a list of femtocell base stations since the amount of information of the femtocell base stations is too great.

FIG. 1 illustrates a configuration of a wireless communication system including femtocell base stations.

As shown in FIG. 1, the wireless communication system includes femtocell base stations 110, a macrocell base station 120, a femto network gateway (FNG) 130, an access service network (ASN) 140, and a connectivity service network (CSN) 150. The macrocell base station 120 is a general base station of the conventional wireless communication system.

Each femtocell base station 110 is a small-size version of the macrocell base station 120 and performs most functions of the macrocell base station 120. The femtocell base station 110 directly connects to a transmission control protocol/Internet protocol (TCP/IP) network and operates independently as the macrocell base station 120 does. The coverage of the femtocell base station 110 is about 0.1 to 30 m and each femtocell base station 110 can accommodate about 10 to 20 mobile stations. The femtocell base station 110 may also use the same frequencies as the macrocell base station 120 or may use different frequencies from the macrocell base station 120.

The femtocell base station 110 may be connected to the macrocell base station 120 through an R1 interface and can receive a downlink channel from the macrocell base station 120 and can transmit a control signal to the macrocell base station 120.

The macrocell base station 120 can cover an indoor or shadow area that is not covered by the macrocell base station 120 and can support high data rates. The femtocell base station 110 may be installed in an overlay fashion in a macrocell and may also be installed in a non-overlay fashion in an area that is not covered by the macrocell base station 120.

The femtocell base station 110 is classified into two types. The first type is a closed subscriber group (CSG) femtocell base station and the second type is an open subscriber group (OSG) femtocell base station. The CSG femtocell base station groups mobile stations capable of accessing it and assigns a CSG identification (ID) to the group of mobile stations and allows only mobile stations assigned the CSG ID to access the CSG femtocell base station. The OSG femtocell base station is a base station which can be accessed by every mobile station.

As a gateway that controls the femtocell base station 110, the FNG 130 is connected to the ASN 140 and the CSN 150 through an Rx interface and an Ry interface. The femtocell base station 110 can receive a service from the CSN 150 through the FNG 130 and a mobile station connected to the femtocell base station 110 can receive services of functions such as authentication and IMS from the FNG 130 or the CSN 150.

The CSN 150 provides the mobile station with connection to an application service such as the Internet or VoIP service. The ASN 140 controls the macrocell base station 120 and manages connection between the macrocell base station 120 and the CSN 150.

FIG. 2 illustrates an example of a conventional method for perform scheduling at a macrocell base station.

The scheduling method shown in FIG. 2 can be considered an extension of the conventional macro-based scheduling method to a hierarchical cell structure. In the conventional method, a macrocell base station receives feedback information (for example, channel information and traffic information) from macro users and allows the users to perform communication using a specific frequency at a specific timing. When this method is extended and applied to the hierarchical cell structure, the macrocell base station can receive all necessary information from femto user and macro user. Here, the femto user can transmit feedback information including a parameter associated with a relation with the femtocell base station rather than a relation with the macrocell base station. Upon receiving the feedback information from the femto user and macro user, the macrocell base station can allocate resources to each user. The macrocell base station can operate while discriminating between the macro user and femto user.

Here, the macro user may feed the necessary information back to the macrocell base station according to the conventional method. The femto user may also feedback the necessary information to the macrocell base station according to the conventional method. Alternatively, the femtocell base station may collect and feedback necessary information of the femto user to the macrocell base station. The fact that the macrocell base station has allocated resources to the femto user indicates that the macrocell base station allows the femto user to communicate with the femtocell base station using the resources.

FIG. 3 illustrates a conventional frame structure for transmitting scheduling information at a macrocell base station.

The macrocell base station can transmit scheduling information to macro user and femto user on a subframe by subframe basis using a macro PDCCH. This conventional scheduling method has problems in that the femtocell base station passively operates to perform functions similar to those of a relay station and cannot perform free scheduling. The conventional scheduling method also has problems in that the scheduling overhead of the macrocell base station is very high and mobile stations with low sensitivity of reception from the macrocell base station cannot receive scheduling information from the macrocell base station.

SUMMARY OF THE INVENTION

Accordingly, the present invention is directed to a method for transmitting scheduling information in a mobile communication system and a femtocell base station using the same that substantially obviate one or more problems due to limitations and disadvantages of the related art.

An object of the present invention is to provide a method for transmitting scheduling information in a mobile communication system.

Another object of the present invention is to provide a femtocell base Station (BS) apparatus for transmitting scheduling information in a mobile communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting scheduling information at a femtocell base station (BS) in a mobile communication system, the method includes transmitting feedback information to a macrocell base station (BS), receiving information of resources that the macrocell BS has allocated to the femtocell BS based on the feedback information from the macrocell BS through a specific control channel in a first time unit, performing scheduling of resources to be used by one or more mobile stations (MSs) serviced by the femtocell BS using the received resource allocation information, and transmitting the scheduled information to the one or more MSs through a specific control channel in a second time unit.

In another aspect of the present invention, a femtocell base station (BS) apparatus for transmitting scheduling information according to the present invention to achieve the above objects, a first transmission module may transmit feedback information to a macrocell BS. Then, a reception module may receive information of resources that the macrocell BS has allocated to the femtocell BS based on the feedback information from the macrocell BS through a specific control channel in a first time unit. Then, a scheduling module may perform scheduling of resources to be used by one or more mobile stations (MSs) serviced by the femtocell BS using the received resource allocation information. Then, a second transmission module may transmit the scheduled information to femto users through a specific control channel in a second time unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following description will be given in detail with reference to the case where the mobile communication system is a 3GPP LTE system, the present invention is not necessarily limited to the specific aspects of the 3GPP LTE and may also be applied to any other mobile communication system.

In some instances, known structures and devices are omitted or are shown in block diagram form, focusing on important features of the structures and devices, so as not to obscure the concept of the present invention. The same reference numbers will be used throughout this specification to refer to the same or like parts.

In addition, in the following description, the term "terminal" is used to generally describe any stationary or mobile user device such as a Mobile Station (MS) or a User Equipment (UE). The term "Base Station (BS)" is used to generally describe any network node such as a Node B or an eNode B that communicates with a terminal.

In a mobile communication system, a terminal can receive information from a BS in downlink and can transmit information in uplink. Examples of the information received or transmitted by the terminal include data and a variety of control information, and a variety of physical channels are provided according to the type and usage of the information received or transmitted by the terminal.

Figure 1:
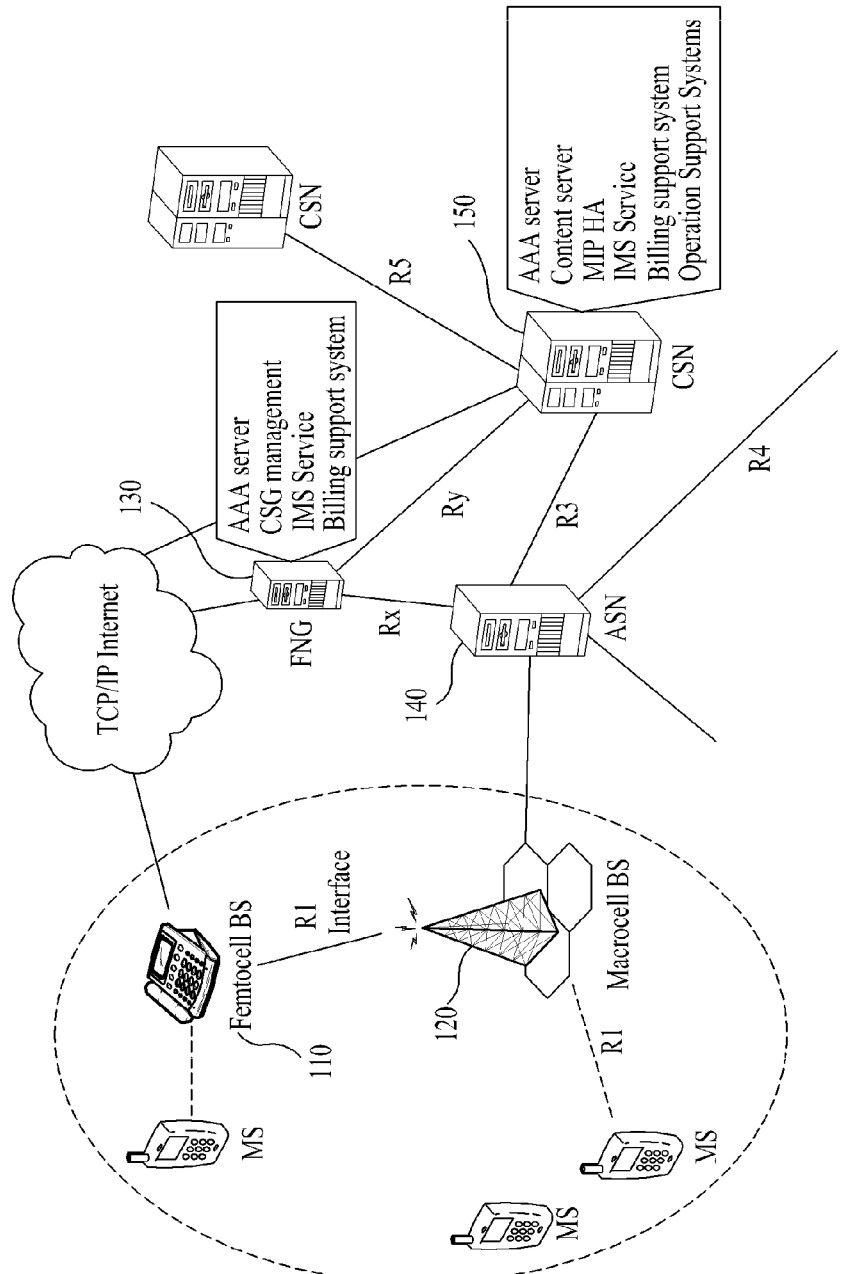
FIG. 1 illustrates physical channels used in a 3rd Generation Partnership Project (3GPP) Long Term Evolution (LTE) system, which is an example mobile communication system, and a general method for transmitting signals using the physical channels.
Figure 2:
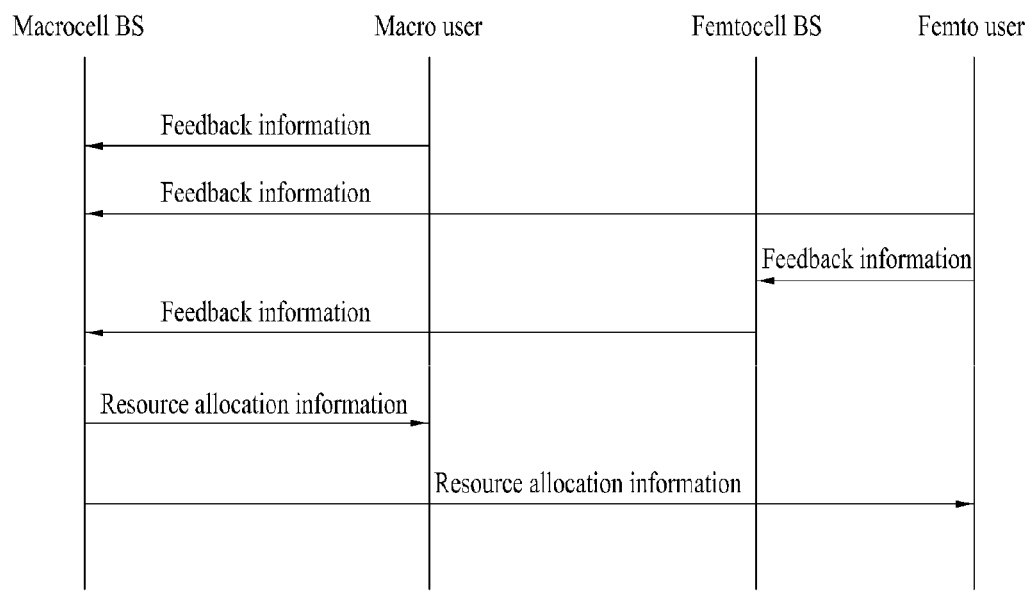
FIG. 2 illustrates an example of a conventional method for a macrocell base station to perform scheduling.
Figure 3:
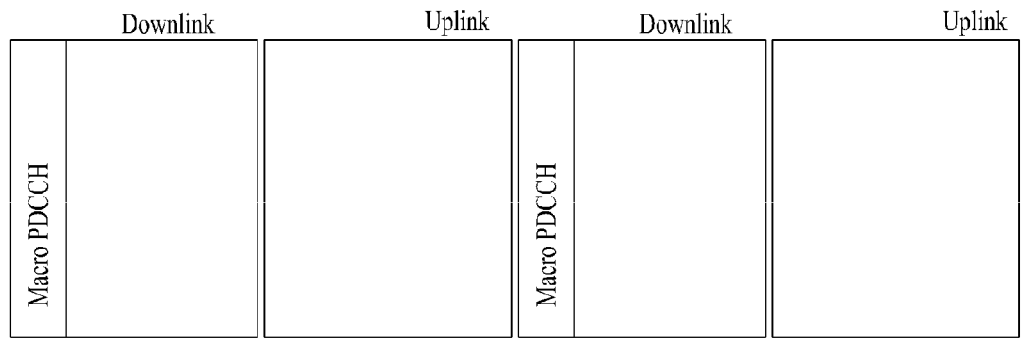
FIG. 3 illustrates a conventional frame structure for a macrocell base station to transmit scheduling information.
Figure 4:
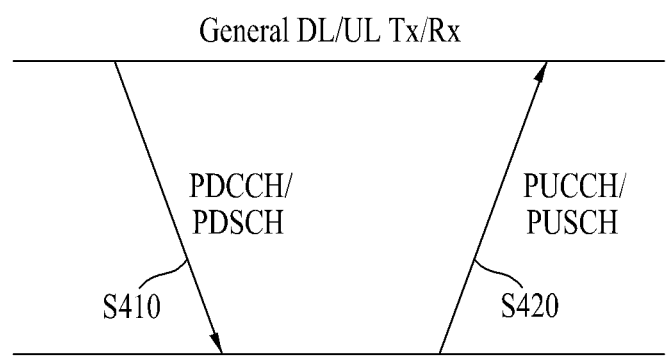
FIG. 4 illustrates general downlink/uplink transmission/reception used in 3rd Generation Partnership Project Long Term Evolution (3GPP LTE) which is an example mobile communication system.

FIG. 4 illustrates general downlink/uplink transmission/ reception used in 3rd Generation Partnership Project Long Term Evolution (3GPP LTE) which is an example mobile communication system.

As shown in FIG. 4, as a general uplink/downlink signal transmission procedure, a BS may transmit a signal through a physical downlink control channel/physical downlink shared channel (S410) and a terminal or Mobile Station (MS) may transmit a signal through a Physical Uplink Shared Channel (PUSCH)/Physical Uplink Control Channel (PUCCH) (S420). Here, control information that the MS transmits to the BS on uplink or receives from the BS on downlink includes a downlink/uplink ACK/NACK signal, a Channel Quality Indicator (CQI), a Precoding Matrix Index (PMI), and a Rank Indicator (RI). In the case of a 3rd Generation Partnership Project Long Term Evolution (3GPP LTE) system, the MS can transmit the control information such as a CQI/PMI/RI through a PUSCH and/or a PUCCH.

In the following, a description will be given of how the mobile communication system operates in an environment having a hierarchical cell structure. The hierarchical cell structure is a structure in which a number of cells with short radiuses are present in a cell having a large coverage radius. That is, in the hierarchical cell structure, a number of cells are ranked due to the coverage radius. For example, femtocells have a hierarchical structure together with a macrocell having a larger coverage radius than each of the femtocells. In this specification, the macrocell BS can be referred to as a macro cell and the femtocell BS can be referred to as a femto cell.

This specification describes an efficient method for hierarchically allocating resources to each MS (or UE) in a hierarchical cell structure.

The macrocell BS and the femtocell BS may use the same frequency band to allocate resources to their users. Here, a variety of methods can be used to avoid interference between users belonging to the macrocell and femto cell.

However, in the present invention, it is assumed that a hierarchical scheduling method, in which the macrocell BS first allocates resources to macro users and the femtocell, and then the femtocell allocates resources to femto users belonging to the femtocell from within a range of resources possessed by the femtocell, is used. The conventional method in which the macrocell BS performs scheduling, instead of the hierarchical method, may be used for the macro users.

As described below, the present invention suggests a variety of schemes that the macrocell BS and the femtocell BS exchange scheduling information with MSs belonging to the each of macrocell and femto cell when the hierarchical scheduling method is used.

Figure 5:
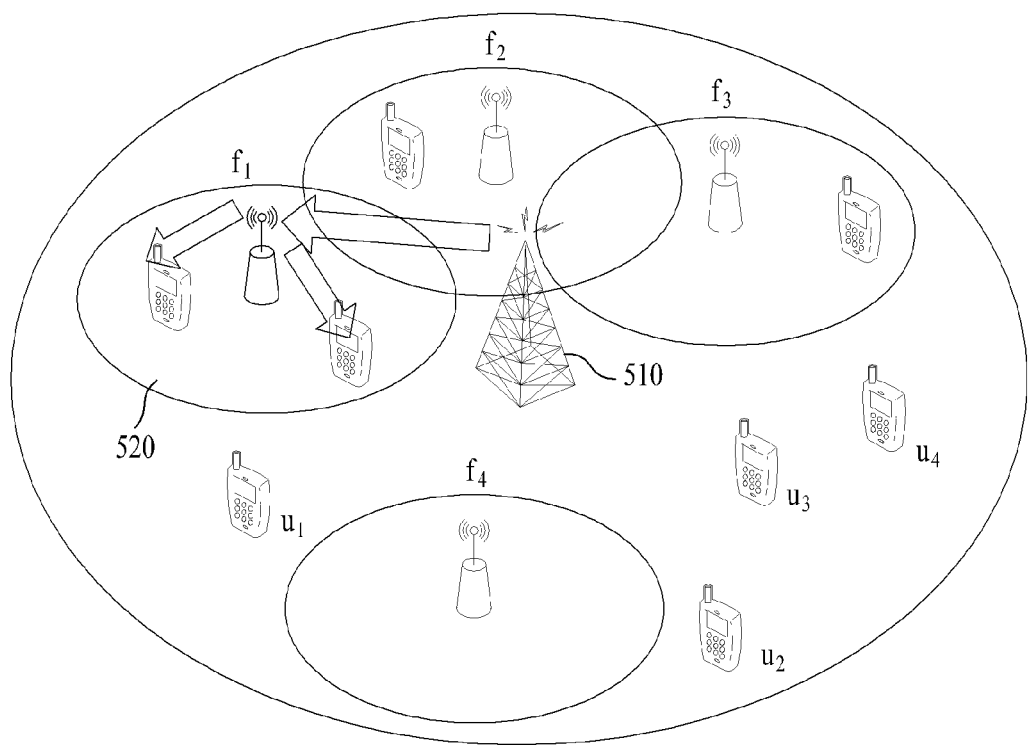
FIG. 5 illustrates a method in which, as an MS does, a femtocell BS performs communication within a femtocell using resources that a macrocell BS has allocated to the femtocell BS according to an embodiment of the present invention.

FIG. 5 illustrates a method in which, as an MS does, a femtocell BS performs communication within a femtocell using resources that a macrocell BS has allocated to the femtocell BS according to an embodiment of the present invention.

Referring to FIG. 5, this embodiment suggests that a femtocell BS f1 request allocation of wireless resources to a macrocell BS 510 in the same manner as when an MS receive resources allocated by the macrocell BS 510. To accomplish this, it is preferable that the femtocell BS f1 request allocation of wireless resources from the macrocell BS 510 using a specific identifier having the same format as an identifier of the MS. In response to the resource allocation request from the femtocell BS f1, the macrocell BS 510 can allocate wireless resources to the femtocell BS f1 corresponding to the specific identifier using the same method as when it allocates wireless resources to the MS. That is, the macrocell BS 510 need not discriminate between the femtocell BS f1 and a general MS when allocating wireless resources.

For example, in the case of the 3GPP LTE system, the femtocell BS may request allocation of resources to the macrocell BS using an identifier such as a Cell Radio Network Temporary Identifier (C-RNTI), a semi-persistent scheduling C-RNTI, or a temporary C-RNTI and then macrocell BS may receive wireless resource allocation information to the femtocell BS the in response to the request. However, it is not necessary to limit the format of the identifier of an MS according to this embodiment if it is an identifier that a BS can use to specify the MS during allocating wireless resources in a wireless communication system.

In the case where the femtocell BS f1 receive wireless resources allocated by the macrocell BS 510 from, the femtocell BS f1 can perform wireless communication with an MS using the wireless resources within its own coverage area. However, it should be noted that the wireless resources that the femtocell BS f1 has been allocated can be used only for communication between the femtocell BS f1 and MS(s) u5 and u6 in a femto BS 520 serviced by the femtocell BS f1 and are not used in other femtocell areas and are not used for communication between the femtocell BS f1 and the macrocell BS 510.

Figure 6:
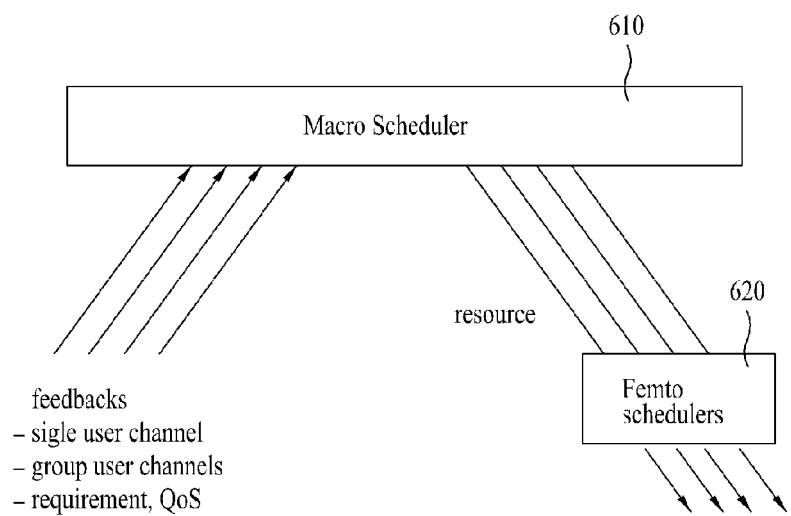
FIG. 6 conceptually illustrates a hierarchical scheduling method according to the present invention from the viewpoint of a scheduler of a macrocell BS.

FIG. 6 conceptually illustrates a hierarchical scheduling method according to the present invention from the viewpoint of a scheduler of a macrocell BS.

As shown in FIG. 6, a scheduler of the macrocell BS or a macro scheduler 610 receives a resource allocation request signal from MS(s). Here, it is assumed that a plurality of MSs serviced by the wireless communication system are divided into a macro user group serviced directly by the macrocell BS and femto user group serviced by respective femtocell BSs. Each MS can transmit single user channel information, Quality of Service (QoS) information, or the like, as feedback information for requesting resource allocation, to the macro scheduler 610. The present invention suggests that the femtocell BS according to this embodiment request resource allocation from the macro scheduler 610 using the same method as that used by the MSs.

Accordingly, similar to the MS, the femtocell BS according to this embodiment can transmit information such as QoS information and channel information of group users in a corresponding femto user group to the macrocell BS.

In addition, it is preferable that, similar to the MS, the femtocell BS according to this embodiment receive a pilot signal or a reference signal from the macrocell BS and report its channel status to the macrocell BS at periodic or aperiodic intervals. It is also preferable that the femtocell BS undergo a process in which each MS acquires identifier information in the cell or a process equivalent to this process in order to use an identifier having the same format of the identifier of the MS when a resource allocation request is made.

An identifier having the MS identifier format that can be used by the femtocell BS may be an identifier of a specific MS in the corresponding femto user group and may also be a specific identifier that has been allocated to the femtocell BS so as to serve as a group identifier of the corresponding femto user group.

On the other hand, from the viewpoint of the macro scheduler 610, it is not necessary to determine whether an entity that has requested allocation of wireless resources is an MS or a femtocell BS. The macro scheduler 610 can allocate wireless resources to an MS or a femtocell BS using feedback information received from the MS or the femtocell BS.

In the case where the entity that receive allocated wireless resources is a femtocell BS, a scheduler of this femtocell BS or the femto scheduler 620 reallocates the allocated wireless resources to an MS in a corresponding femtocell so that the wireless resources can be used for communication in the femtocell.

In this embodiment, the femtocell BS receive allocated wireless resources from the macrocell BS in the same manner as the MS, and the femtocell BS allocates the wireless resources to MS(s) in a corresponding femto user group as described above and therefore it is possible to efficiently allocate wireless resources without modifying the macrocell BS. This method is advantageous over the conventional method using a relay station in which a macrocell BS recognizes a relay station for resource allocation and in which it is necessary to change a wireless frame used by the macrocell BS for the relay station.

A description will now be given of a hierarchical scheduling method according to a variety of embodiments of the present invention. The following description will be given with reference to one subframe among a variety of time units (for example, one subframe, one slot, two or more subframes, and two or more slots) as an example of a time unit. In addition, examples of a control channel that a macrocell BS or a femtocell BS uses for transmitting control information include a PDCCH and a DL/UL MAP. In the present invention, the control channel is exemplified by the PDCCH.

First Embodiment

Figure 7:
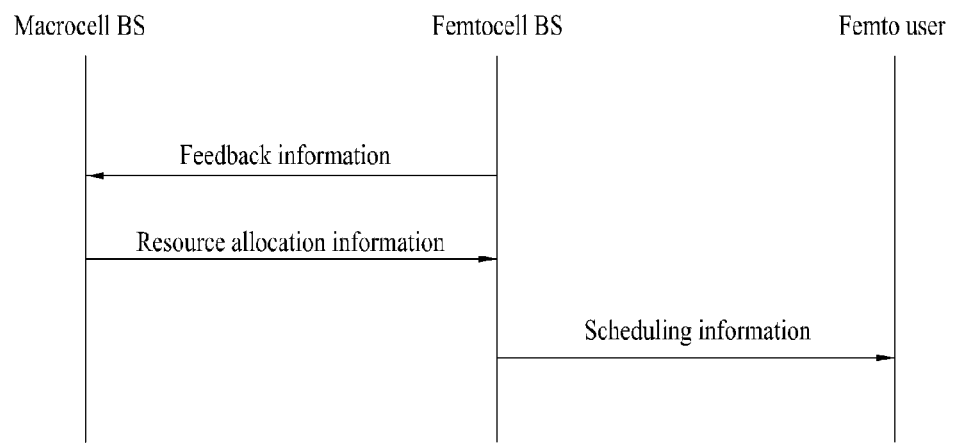
FIG. 7 illustrates an example method for a macrocell BS to perform hierarchical scheduling.

FIG. 7 illustrates an example method for performing hierarchical scheduling at a macrocell BS.

In this embodiment, a femtocell BS can perform free scheduling as shown in FIG. 7. The macrocell BS can allocate resources to the femtocell BS based on feedback information received from the femtocell BS. Here, the macrocell BS can allocate a predetermined amount of resources to the femtocell BS without taking into consideration each femto user. The feedback information may include information such as channel status information of femto user and a requested amount of resources of each femto user belonging to the femto cell. The femtocell BS can broadcast scheduling information to allocate resources to femto users belonging to the femtocell BS in the resources allocated to the femtocell BS through a predefined femto control channel (for example, a femto physical downlink control channel (PDCCH)) and the femto users receive this information so that they can determine resources which they use to perform communication. The PDCCH is a control channel that can transmit information such as transmission format and uplink/downlink resource allocation information.

Figure 8:
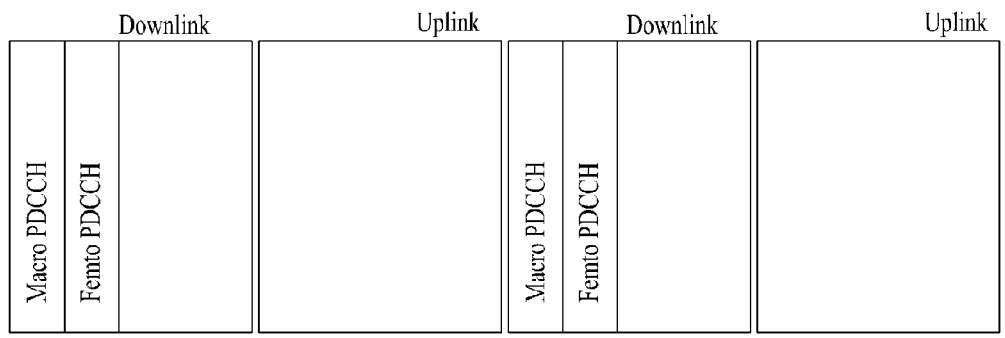
FIG. 8 illustrates an example of a frame structure for transmitting scheduling information according to the embodiment shown in FIG. 7.

FIG. 8 illustrates an example of a frame structure for transmitting scheduling information according to the embodiment shown in FIG. 7.

In this embodiment shown in FIG. 8, the femtocell BS can perform free scheduling so that the femtocell BS can independently schedule resource allocation for its users. Accordingly, this embodiment has an advantage in that an MS with low sensitivity of reception from the macrocell BS can receive scheduling information from the femtocell BS. In the case where the femtocell BS receives scheduling information from the macrocell BS, a time interval in which the femtocell BS can immediately reschedule resources to its users within a resource region of the femtocell BS may be very short. That is, it is preferable that a turnaround time, which is a time required between reception and transmission, be relatively short since the femtocell BS should broadcast scheduling information immediately after receiving the scheduling information of the macrocell BS. Here, the femtocell BS can broadcast scheduling information using of a femto PDCCH which is different from a macro PDCCH in which scheduling information transmitted by the macrocell BS is carried. In this embodiment, the femto PDCCH may be an interval commonly used by all femto BSs.

Second Embodiment

Figure 9:
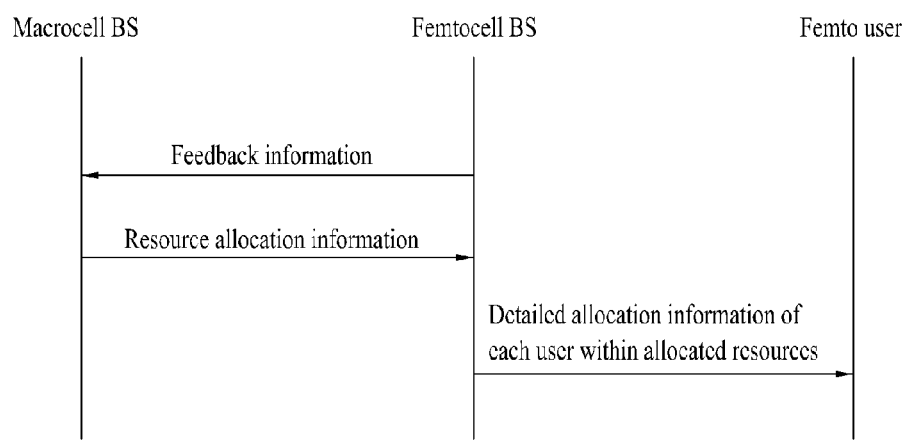
FIG. 9 illustrates an example method for a macrocell BS to perform hierarchical scheduling.

FIG. 9 illustrates an example method for performing hierarchical scheduling at a macrocell BS.

In this embodiment, the macrocell BS allocates bulk resources to a femtocell BS and then the femtocell BS broadcasts scheduling information for femto users using a start portion of a resource region allocated to the femtocell BS as shown in FIG. 9.

That is, if the femtocell BS transmits feedback information (for example, a requested amount of resources and channel status information) to the macrocell BS, then the macrocell BS can allocate bulk resources, which are determined to suit the channel status and the requested amount of the femtocell BS based on the received feedback information, to the femtocell BS. Then, the femtocell BS can broadcast information indicating, in detail, how to allocate resources to each femto user belonging to the femtocell BS using a start portion of the resources allocated to the femtocell BS. Each femtocell BS has an individual PDCCH within resources allocated to the femtocell. Here, each femto user can determine which resource region has been allocated to its serving femtocell BS by receiving the PDCCH of the macrocell BS and can determine where resources that are to be used by the femto user are located by detecting an initial portion of the resource region.

Figure 10:
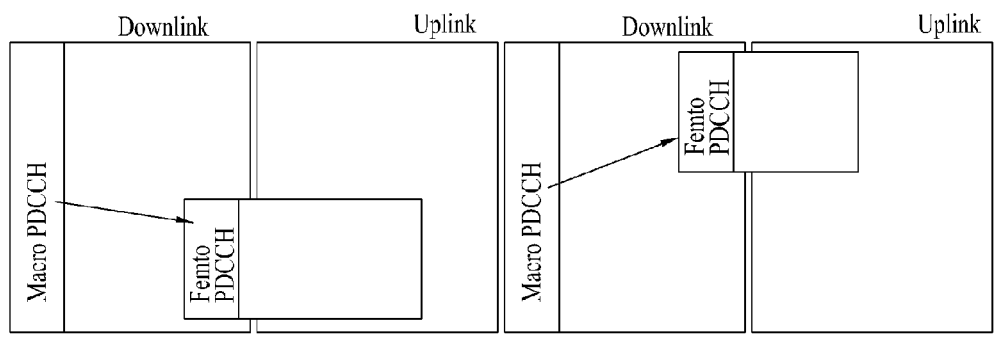
FIG. 10 illustrates an example of a frame structure for transmitting scheduling information according to the embodiment shown in FIG. 9.

FIG. 10 illustrates an example of a frame structure for transmitting scheduling information according to the embodiment shown in FIG. 9.

The macrocell BS can transmit bulk resource allocation information to the femtocell BS using a macro PDCCH interval on downlink. The femtocell BS can know which resource region has been allocated to its serving femtocell BS by receiving resource allocation information from the macrocell BS through the macro PDCCH and can know where resources that are to be used by the femtocell BS are located by detecting an initial portion of the resource region. The femtocell BS can broadcast scheduling information for femto users using a start portion of the resource region allocated to the femtocell BS within the macro PDCCH. The femto PDCCH information may change for each femto user and for each femto cell BS.

In this embodiment, the femtocell BS can perform free scheduling and can also broadcast PDCCH information within its own resource region and therefore it can save the time required to receive a PDCCH of the macrocell BS and then to perform rescheduling and can secure a sufficient time required for the processing. However, an MS with low sensitivity of reception from the macrocell BS may fail to know where a region of its serving femtocell BS is located.

Third Embodiment

Figure 11:
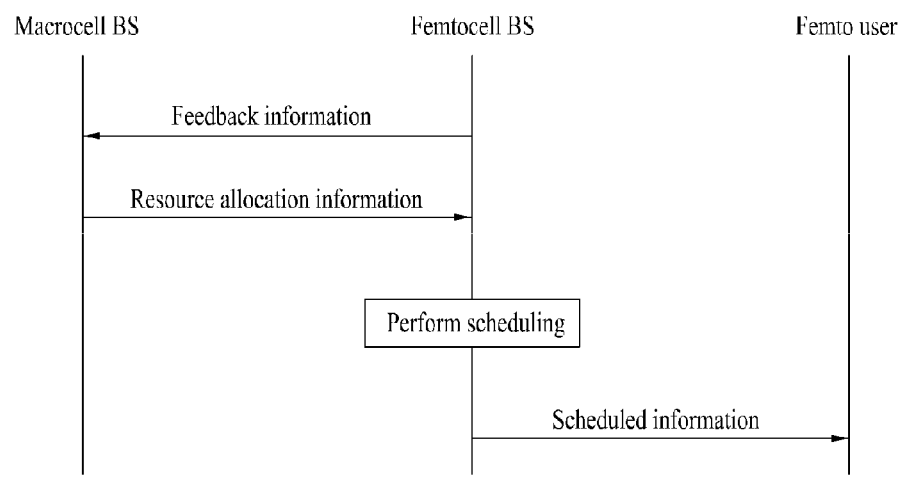
FIG. 11 illustrates an example method for a macrocell BS to perform hierarchical scheduling.

FIG. 11 illustrates an example method for performing hierarchical scheduling at a macrocell BS.

In this embodiment, the femtocell BS can transmit feedback information to the macrocell BS as shown in FIG. 11. Here, the feedback information may include information such as channel status information and a requested amount of resources. Upon receiving this feedback information, the macrocell BS can allocate bulk resources to the femtocell BS. That is, the macrocell BS can transmit resource allocation information for the femtocell BS on a subframe by subframe basis using a downlink control channel (for example, a macrocell BS PDCCH) of subframe. The femtocell BS can broadcast scheduling information for each femto user through a scheduling information broadcast portion of the macrocell BS. Here, broadcasting of the scheduling information of the macrocell BS may cause interference.

Figure 12:
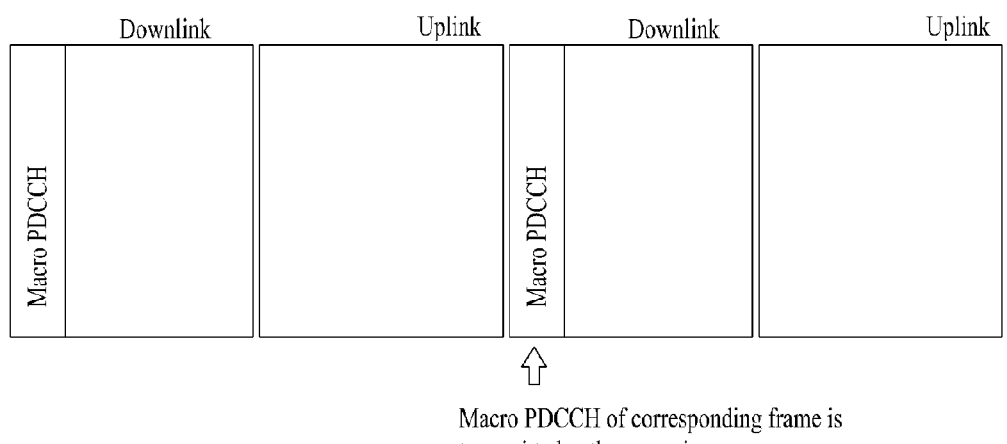
FIG. 12 illustrates an example of a frame structure for transmitting scheduling information according to the embodiment shown in FIG. 11.

FIG. 12 illustrates an example of a frame structure for transmitting scheduling information according to the embodiment shown in FIG. 11.

In this embodiment, an overall process may occur over two subframes. In a macro PDCCH of the first subframe, the macrocell BS can allocate bulk resources to the femtocell BS. That is, the macrocell BS can allocate resources required by the femtocell BS to the femtocell BS in bulk. Then, the femtocell BS can perform detailed scheduling of allocation of resources to each of its femto users based on the resources allocated to the femtocell BS. The femtocell BS can independently broadcast such scheduling information using a macro PDCCH of the second subframe. Each femto user can know a resource position where it should perform communication by receiving the scheduling information.

As shown in FIG. 12, a control channel for the macrocell BS and a control channel for the femtocell BS may be discriminated using at least one of time, frequency, or code in one subframe. On the other hand, the femto PDCCH may overlap the macro PDCCH, thereby causing interference. The femtocell BS can transmit PDCCH information at the same timing while accepting the occurrence of interference.

Although this embodiment operates on a 2-subframe basis, this embodiment does not change throughput since a process of the current subframe and a process of a previous subframe are present together in one subframe. This embodiment has advantages in that MSs can operate without additional frame change and an MS with low sensitivity of reception from the macrocell BS can also operate well. In the case where a channel coherent time is shorter than 2 subframes due to the operation over 2 subframes, the channel feedback information may be different from channel status of timing that actual resources are used. In addition, macro users in a femtocell coverage may experience PDCCH interference due to overlapping of macro PDCCH and femto PDCCH.

Fourth Embodiment

Figure 13:
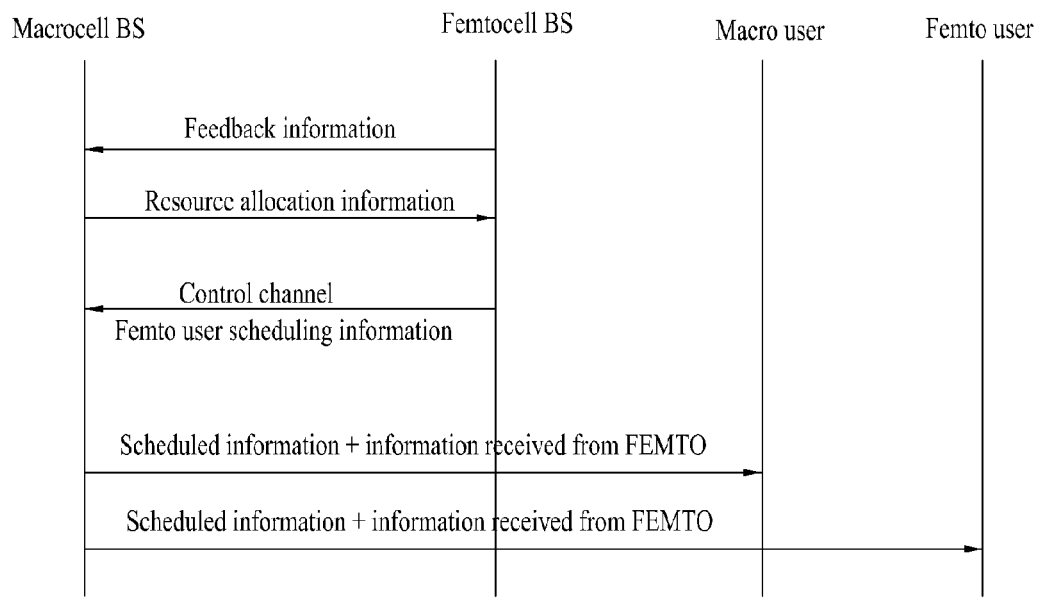
FIG. 13 illustrates an example method for a macrocell BS to perform hierarchical scheduling.

FIG. 13 illustrates an example method for perform hierarchical scheduling a macrocell BS.

In this embodiment, the femtocell BS can transmit feedback information to the macrocell BS as shown in FIG. 13. Here, the feedback information may include information such as channel status information and a requested amount of resources. The macrocell BS can allocate resources (or bulk resources) to the femtocell BS based on the received feedback information. If the femtocell BS performs scheduling of each femto user and transmits the scheduling information to the macrocell BS, then the macrocell BS can broadcast the scheduled information including the scheduling information in a macro scheduling information broadcast region of a next subframe. This embodiment also operates over two subframes.

In the first subframe, the macrocell BS can transmit information of resources (for example, bulk resources) allocated to the femtocell BS to the femtocell BS. Thereafter, in the time of the first subframe, the femtocell BS can complete scheduling for each femto user belonging to the femtocell BS and can transmit the scheduling information to the macrocell BS using the allocated resources under control of the femto BS. Then, the macrocell BS can broadcast information including information of the results of scheduling performed by the macrocell BS and, in addition, the scheduling information received from the femtocell BS through all PDCCHs of the second subframe. By receiving this scheduling signal, the femto user can know which region the femto user will use to perform communication.

Figure 14:
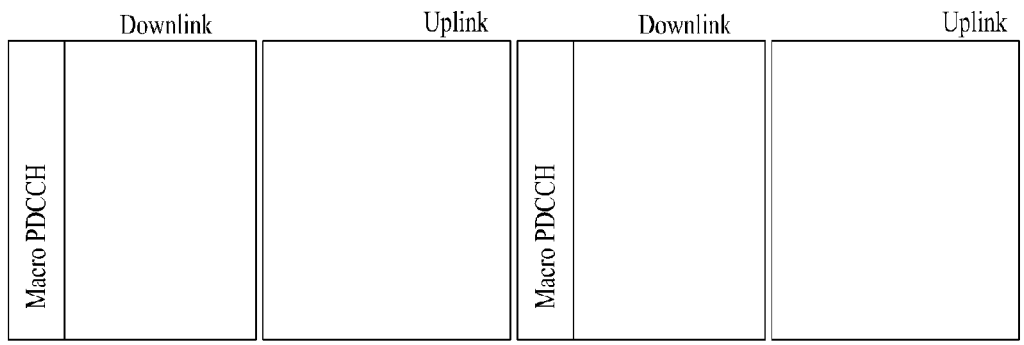
FIG. 14 illustrates an example of a frame structure for transmitting scheduling information according to the embodiment shown in FIG. 13.

FIG. 14 illustrates an example of a frame structure for transmitting scheduling information according to the embodiment shown in FIG. 13.

As shown in FIG. 14, the MS can properly operate as long as it can receive macro PDCCH information. The femtocell BS can transmit scheduled information to the macrocell BS through uplink. Overhead due to this transmission may slightly reduce overall throughput. The MS may also fail to receive PDCCH information if its sensitivity of reception from the macrocell BS is low.

Fifth Embodiment

Figure 15:
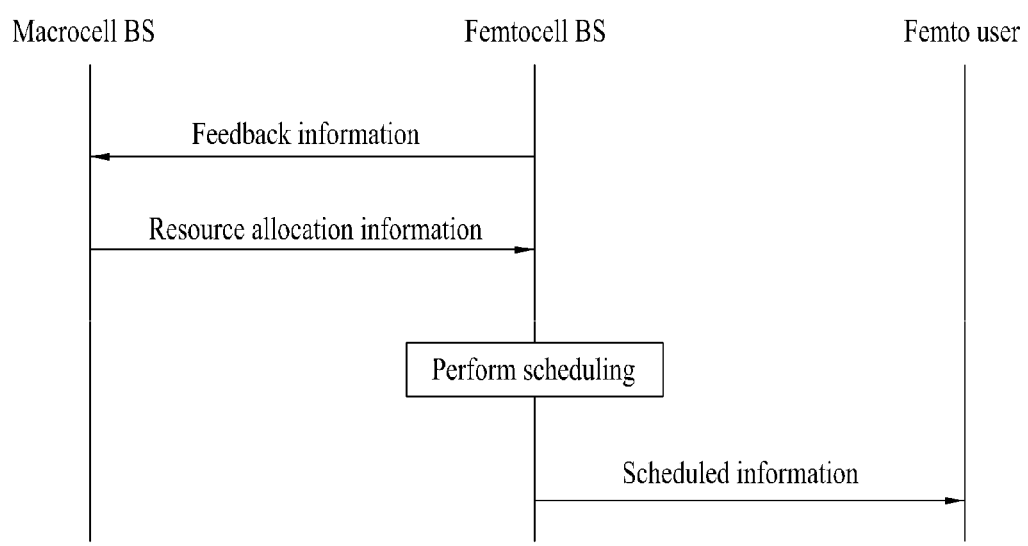
FIG. 15 illustrates an example method for a macrocell BS to perform hierarchical scheduling.

FIG. 15 illustrates an example method for performing hierarchical scheduling at a macrocell BS.

In this embodiment, the femtocell BS can transmit feedback information to the macrocell BS as shown in FIG. 15. Here, the feedback information may include information such as channel status information and a requested amount of resources. The macrocell BS can allocate bulk resources to the femtocell BS based on the received feedback information. The macrocell BS can transmit bulk resource allocation information to the femtocell BS using a macro PDCCH in the first subframe. Thereafter, the femtocell BS can transmit femto user scheduling information to femto user using a femto PDCCH in the second subframe. Here, the femto PDCCH of the second subframe may be a subsequent to a macro PDCCH of the second subframe.

Figure 16:
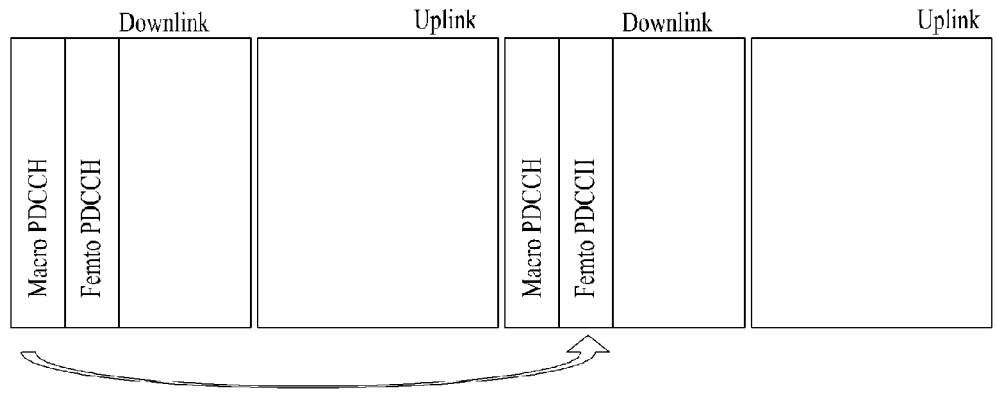
FIG. 16 illustrates an example of a frame structure for transmitting scheduling information according to the embodiment shown in FIG. 15.

FIG. 16 illustrates an example of a frame structure for transmitting scheduling information according to the embodiment shown in FIG. 15.

This embodiment shown in FIG. 16 also operates over 2 subframes. The macrocell BS can transmit resource allocation information to the femtocell BS through a macro PDCCH of the first subframe. Then, the femtocell BS can perform scheduling for femto user belonging to the femtocell BS using the resource allocation information received from the macrocell BS. Then, the femtocell BS can transmit scheduling information to femto user by broadcasting the scheduling information using a femto PDCCH in the second subframe.

This embodiment is characterized in that an MS with low sensitivity of reception from the macrocell BS can also obtain scheduling information if it has received only the femto PDCCH. However, allocation of a separate femto PDCCH may slightly increase overhead. As shown in FIG. 16, a control channel for the macrocell BS and a control channel for the femtocell BS may be discriminated using at least one of time, frequency, or code in one subframe.

As another embodiment of the present invention, it is also possible to consider a method that uses the first to fifth embodiments in a hybrid fashion. In the first and fifth embodiments, MSs with low sensitivity of reception from the macrocell BS may also operate well.

That is, even though they have low sensitivity of reception from the macrocell BS, MSs can normally operate because they can know which resource region they should use as long as they can receive PDCCH information of the femtocell BS. The second to fourth embodiments, i.e., may be suitable for operations of MSs with high sensitivity of reception from the macrocell BS. Accordingly, the femtocell BS may discriminate between MSs with high sensitivity of reception from the macrocell BS and MSs with low reception sensitivity and the macrocell BS, femtocell BSs, and users may exchange scheduling information with each other using a hybrid scheme of the first to fifth embodiments.

As above described, a method for performing scheduling hierarchically at macrocell base station is referred with various embodiments in the FIGS. 7 to 16. In the FIGS. 7 to 16, the method for performing scheduling hierarchically at a macrocell BS is described using the Time Division Duplex (TDD) frame structures. However, the TDD frame structure is an only example, the method for performing scheduling hierarchically at a macrocell BS according to the present invention can be applied to various systems such as TDD frame structure, FDD frame structure, etc. Also, various embodiments of the present invention can be applied to mobile communication system such as 3GPP LTE, LTE-A, IEEE 802.16 system, etc.

Figure 17:
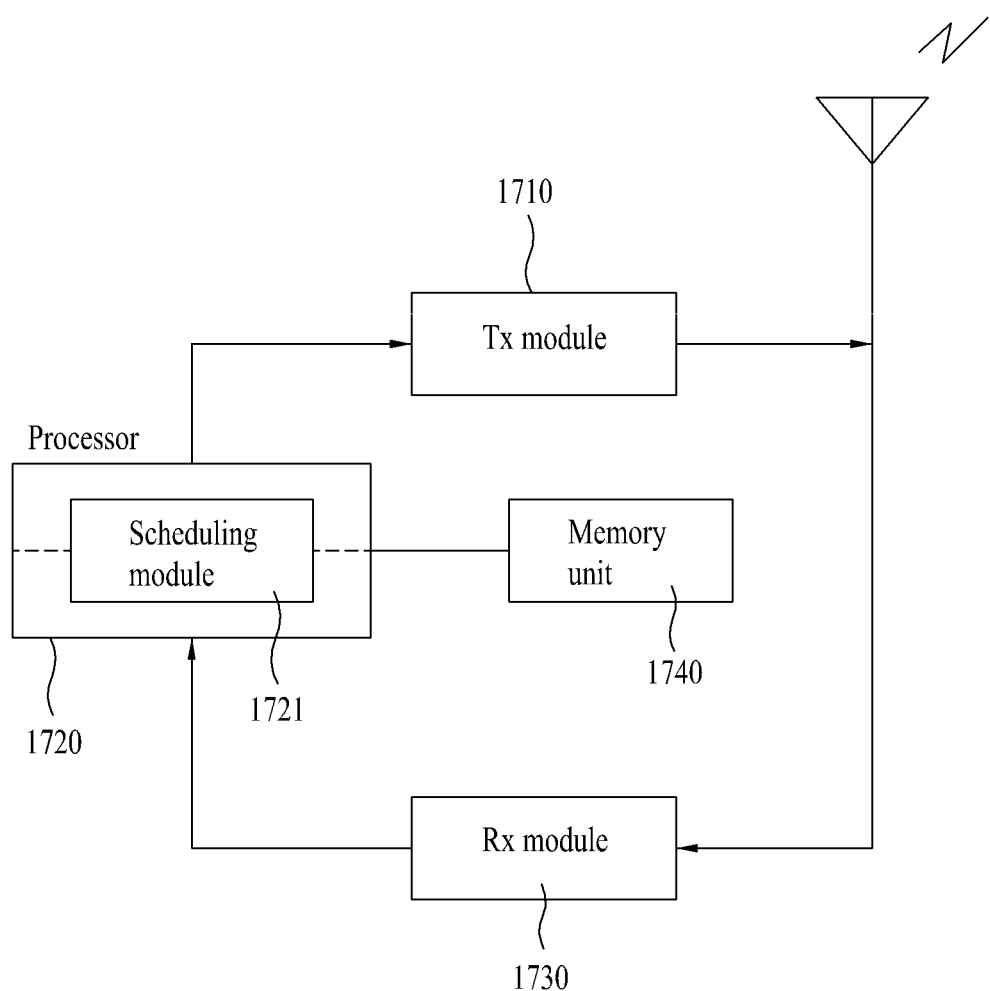
FIG. 17 illustrates a configuration of a preferred embodiment of a femtocell BS apparatus that performs scheduling according to the present invention.

FIG. 17 illustrates a configuration of a preferred embodiment of a femtocell BS apparatus that performs scheduling according to the present invention.

As shown in FIG. 17, the femtocell BS apparatus that performs scheduling according to the present invention may include a transmission module 1710, a processor 1720, a reception module 1730, and a memory unit 1740. The processor may include a scheduling module 1721.

The transmission module 1710 can transmit feedback information to the macrocell BS and can transmit scheduled information to one or more MSs through a specific control channel in a specific time unit.

The scheduling module 1721 performs scheduling for resources, which are to be used by one or more MSs serviced by the femtocell BS, using resource allocation information received from the macrocell BS.

The reception module 1730 can receive information of resources, which the macrocell BS has allocated to the femtocell BS based on feedback information, from the macrocell BS through a specific control channel in a specific time unit.

The memory unit 1740 can store information received from the outside, scheduling results, or the like for a predetermined time.

The above description has been given of how a femtocell BS exchanges information with a macrocell BS in a mobile communication system having a hierarchical cell structure when the femtocell BS hierarchically schedules use of resources in cooperation with the macrocell BS in order to service femto users belonging to the femtocell BS. When networks with different coverage such as femtocell and cellular networks cells are present together while using the same frequency regions in a mobile communication system having a hierarchical cell structure, it is possible to dynamically allocate resources taking into consideration requirements of users belonging to each network.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, those skilled in the art can use the elements described in the above embodiments in a combined fashion.

Accordingly, the invention should not be limited to the specific embodiments described herein, but should be accorded the broadest scope consistent with the principles and novel features disclosed herein.

What is claimed is:

1. A method for transmitting scheduling information at a first base station in a mobile communication system, the method comprising:
    transmitting feedback information, including a resource requirement of one or more mobile stations serviced by the first base station, to a second base station;
    receiving resource allocation information from the second base station via a first control channel in a first subframe of a frame,
    wherein the resource allocation information includes first bulk resources allocated for the first base station, wherein the first bulk resources is a contiguous region of resources,
    wherein the first bulk resources allocated for the first base station are allocated by the second base station based on the feedback information;
    re-allocating the first bulk resources into a region of a second control channel and a region of second resources to be used by the one or more mobile stations serviced by the first base station based on the resource allocation information, wherein the second control channel is a downlink control channel, and wherein the region of second resources is an uplink region; and
    transmitting, to the one or more mobile stations, scheduling information related to the second resources to be used by the one or more mobile stations via the second control channel,
    wherein the second control channel begins at a predetermined position of the first bulk resources, and a location of the second control channel is computed by the one or more mobile stations based on the first control channel carrying the resource allocation information from the second base station, and
    wherein the first base station is a femtocell base station (BS) and the second base station is a macrocell BS; and the first control channel in the first subframe corresponds to a macrocell BS dedicated control channel and the second control channel corresponds to a femtocell BS dedicated control channel.

2. The method according to claim 1, wherein the macrocell BS dedicated control channel and the femtocell BS dedicated control channel are discriminated through at least time, frequency, or code if both the first control channel and the second control channel are included in the first subframe.

3. The method according to claim 1, wherein:
the first base station is a femtocell base station (BS) and the second base station is a macrocell BS; and
the second control channel is included in a second subframe following the first subframe within the frame.

4. The method according to claim 1, wherein a location of the first control channel is fixed and the location of the second control channel varies according to a location of the first bulk resources.

5. The method according to claim 1, wherein the first control channel in the first subframe is a macro physical downlink control channel (PDCCH) and the second control channel is a femto PDCCH.

6. The method according to claim 1, wherein the first control channel in the first subframe or the second control channel includes downlink MAP or uplink MAP information.

7. The method according to claim 1, wherein the mobile communication system uses a Time Division Duplex (TDD) or Frequency Division Duplex (FDD) scheme.

8. A first base station for transmitting scheduling information in a mobile communication system, the first base station comprising:
a first transmission module for transmitting feedback information, including a resource requirement of one or more mobile stations serviced by the first base station, to a second base station;
a reception module for receiving resource allocation information from the second base station via a first control channel in a first subframe of a frame,
wherein the resource allocation information includes first bulk resources allocated for the first base station, wherein the first bulk resources is a contiguous region of resources,
wherein the first bulk resources allocated for the first base station are allocated by the second base station based on the feedback information;
a scheduling module for re-allocating the first bulk resources into a region of a second control channel and a region of second resources to be used by the one or more mobile stations serviced by the first base station based on the resource allocation information, wherein the second control channel is a downlink control channel, and wherein the region of second resources is an uplink region; and
a second transmission module for transmitting the scheduling information related to the second resources to be used by the one or more mobile stations via the second control channel,
wherein the second control channel begins at a predetermined position of the first bulk resources, and a location of the second control channel is computed by the one or more mobile stations based on the first control channel carrying the resource allocation information from the second base station, and
wherein the first base station is a femtocell base station (BS) and the second base station is a macrocell BS; and
the first control channel in the first subframe corresponds to a macrocell BS dedicated control channel and the second control channel corresponds to a femtocell BS dedicated control channel.

9. The first base station according to claim 8, wherein the macrocell BS dedicated control channel and the femtocell BS dedicated control channel are discriminated through at least time, frequency, or code.

10. The first base station according to claim 8, wherein:
the first base station is a femtocell base station (BS) and the second base station is a macrocell BS; and
wherein the second control channel is included in a second subframe following the first subframe within the frame.

11. The first base station according to claim 8, wherein a location of the first control channel is fixed and the location of the second control channel varies according to a location of the first bulk resources.

12. The first base station according to claim 8, wherein the first control channel in the first subframe is a macro physical downlink control channel (PDCCH) and the second control channel is a femto PDCCH.

* * * * *